United States Patent
Banet et al.

(10) Patent No.: US 7,239,961 B2
(45) Date of Patent: Jul. 3, 2007

(54) METHOD FOR INPUTTING DESTINATION DATA THROUGH A MOBILE TERMINAL

(75) Inventors: Franz-Josef Banet, Vaihingen (DE); Rodolfo Lopez Aladros, Stuttgart (DE); Stephan Rupp, Besigheim (DE)

(73) Assignee: Alcatel, Paris (FR)

( * ) Notice: Subject to any disclaimer, the term of this patent is extended or adjusted under 35 U.S.C. 154(b) by 72 days.

(21) Appl. No.: 11/016,907

(22) Filed: Dec. 21, 2004

(65) Prior Publication Data
US 2005/0246095 A1 Nov. 3, 2005

(30) Foreign Application Priority Data
Feb. 26, 2004 (EP) ................... 04290524

(51) Int. Cl.
*G01C 21/30* (2006.01)
(52) U.S. Cl. .............. 701/208; 701/200; 701/211; 340/995.12; 342/357.09
(58) Field of Classification Search .............. 701/1, 701/200, 201, 210, 211, 212, 300, 208; 340/991, 340/995.12; 342/357.09, 357.13
See application file for complete search history.

(56) References Cited

U.S. PATENT DOCUMENTS

| | | | |
|---|---|---|---|
| 3,353,023 A | 11/1967 | Lowery et al. | |
| 5,475,597 A * | 12/1995 | Buck | 455/456.5 |
| 6,124,826 A | 9/2000 | Garthwaite et al. | |
| 6,452,544 B1 * | 9/2002 | Hakala et al. | 342/357.13 |
| 6,622,083 B1 | 9/2003 | Knockeart et al. | |
| 2003/0100976 A1 * | 5/2003 | Watanabe et al. | 701/1 |
| 2004/0064245 A1 * | 4/2004 | Knockeart et al. | 701/117 |

FOREIGN PATENT DOCUMENTS

WO WO 02/37446 A1 5/2002
WO WO 02/082405 A1 10/2002

OTHER PUBLICATIONS

Patent Abstracts of Japan, vol. 018, No. 085,(P-1691), Feb. 10, 1994, & JP 05 289997 A (Sumitomo Wiring Syst LTD), Nov. 5, 1993.

* cited by examiner

*Primary Examiner*—Gertrude A. Jeanglaude
(74) *Attorney, Agent, or Firm*—Sughrue Mion, PLLC

(57) ABSTRACT

The invention relates to a method for inputting destination data into a navigation system as well as a mobile terminal and a navigation system for executing this method. The mobile terminal having a short range wireless interface is brought into contact with the navigation system. The mobile terminal selects at least one data record including data concerning an address. Then, it transfers the at least one data record via the short range interface to the navigation system. The navigation system extracts from the received data record destination data capable to be used as source for a destination processed by the navigation system.

10 Claims, 1 Drawing Sheet

METHOD FOR INPUTTING DESTINATION DATA THROUGH A MOBILE TERMINAL

BACKGROUND OF THE INVENTION

The invention is based on a priority application EP 04290524.0 which is hereby incorporated by reference.

The present invention relates to a method of inputting destination data into a navigation system as well as a mobile terminal and a navigation system used for executing this method.

A structure of a known navigation system for a car is, for example, described in U.S. Pat. No. 3,353,023.

A navigation system is composed of a processor in the form of a CPU having a plurality of inputs supplied with output signals from an azimuth direction sensor operating on the basis of terrestrial magnetism, a distance sensor for detecting a distance covered by the car by measuring the rotation numbers of a wheel and an absolute position setting sensor in the form of a radio receiver, for example a GPS receiver (GPS=Global Positioning System). Further, such navigation system has a CD-ROM storing road network data.

In operation of the navigation system, the travelling direction is detected by the azimuth direction sensor while the distance covered is detected by the distance sensor. The absolute position setting sensor receives signals from GPS satellites for determining an absolute reference position. The CPU determines the current location of the car on the basis of the output signals from the azimuth direction sensor, the distance sensor and the absolute position setting sensor while referring to the road network data stored in the CD-ROM.

Further, navigation systems are known that download via a cellular communication network data such as map data, route data and traffic data from an information service center and use such data for providing navigation services to the driver of the car.

Further, navigation system typically are equipped with input devices like a keypad for inputting route data or data about the destination of a route guided by the navigation system. But, every input made by the user holds the risk of a typing error and, due to the restricted input means of the car navigation system and the specific environmental conditions within a car, the typing of such car needs some time and makes the operation of the navigation system uncomfortable.

It is an object of the present invention to improve the data input into a navigation system.

SUMMARY OF THE INVENTION

The object of the present invention is achieved by a method for inputting destination data into a navigation system, wherein the method comprising the steps of bringing a mobile terminal having a short range wireless interface via this interface into contact with the navigation system; selecting, at the mobile terminal, at least one data record including data concerning an address; transferring the at least one data record via the short range interface from the mobile terminal to the navigation system; and extracting, at the navigation system, from the received data record destination data capable to be used as source for a destination processed by the navigation system. The object of the present invention is further achieved by a mobile terminal comprising a short range wireless interface unit adapted to contact a navigation system, a storage unit adapted to store data concerning one or more addresses, and a control unit for selecting at least one data record including data concerning an address and transferring the at least one data record via the short range interface unit to the navigation system. The object of the present invention is further achieved by a navigation system comprising a short range wireless interface unit adapted to contact a mobile terminal and a control unit for receiving at least one data record via the short range wireless interface unit from the mobile terminal and extracting from the received data record destination data capable to be used as source for a destination processed by the navigation system.

Various advantages are achieved by the invention: In many cases, the user carries with him or her a mobile terminal, for example, a cellular phone or a PDA, which already comprises a data base containing various information about persons and organizations that are of interest for the respective user. Further, such data more and more comprises address data of such persons and organizations of interest. In many cases a destination address inputted by a user relates to such persons and organizations of interest already electronically stored in the mobile device carried by the respective user. Thanks to the invention, such already stored information may be reused which makes the input of data really simple and prevents the risk of typing errors. A small invest in software and/or hardware means result in a tremendous improvement of user-friendliness, time and reuse of data. The input of data into a navigation system becomes very simple and fast.

Further advantages are achieved by the embodiments of the invention indicated by the dependent claims.

According to a preferred embodiment of the invention, the mobile device transfers as data record a data record to the navigation system, which comprises the whole entry of a selected user stored in a directory data base of the mobile terminal. The mobile device has not to compute data stored in the directory data base of the mobile terminal and already existing mechanisms of the mobile terminal can be reduced for the implementation of the invention. For example, already existing features for exchanging data base entries between mobile phones via an infrared or bluetooth interface may be reused for the implementation of the invention. Small software changes may be sufficient to implement the invention in the mobile device. On the other hand, the navigation system has to extract the address data from the rest of the data contained in the data base entry which increases the efforts necessary for the implementation of the invention at the navigation system side. But, the overall implementation costs are noticeable reduced since the number of modified mobile terminals is considerable larger than the number of modified navigation systems.

Preferably, the mobile terminal transfers the data of the data records encoded in an ASCI format and does not apply a specific communication protocol. Thereby, further reductions of implementation costs are achievable.

But, it is also possible that the mobile terminal extracts address data included in the entry of a selected user stored in the directory data of the mobile terminal and transfers the extracted address data within the data record to the navigation system. Such approach simplifies the implementation of the navigation system side part of the invention. Further, it becomes easier for the navigation system to receive usable data from different types of mobile terminals, for example, from different types of mobile phones or PDAs (PDA=Personal Digital Assistant).

Further improvements are achieved by implementing following functionalities in the navigation system:

First of all, it is possible that the navigation system checks the plausibility of the extracted destination data by means of an address data base. By means of this data base it may check whether the extracted address exist and may complete the extracted address. Further, it may use the address data base for deciding which of the received data has to be extracted and capable to be used as source for a destination.

Further, it is possible that the navigation system corrects the extracted destination data by means of this address data base.

Preferably, the navigation system sends a query to a remote address data base, for example an address data base administrated by a network server, when executing the aforementioned procedures. Thereby, the execution always relates to an up-to-date data base.

Further, it is possible to provide a back-channel between the mobile terminal and the navigation system. Preferably, a notification is sent back via this back-channel to the mobile terminal, if the address data are not correct and/or are corrected. This improves the user-friendliness of the system.

BRIEF DESCRIPTION OF THE DRAWINGS

These as well as other features and advantages of the invention will be better appreciated by reading the following detailed description of presently preferred exemplary embodiments taken in conjunction with the accompanying drawing of which.

DETAILED DESCRIPTION OF THE DRAWINGS

Figure 1:
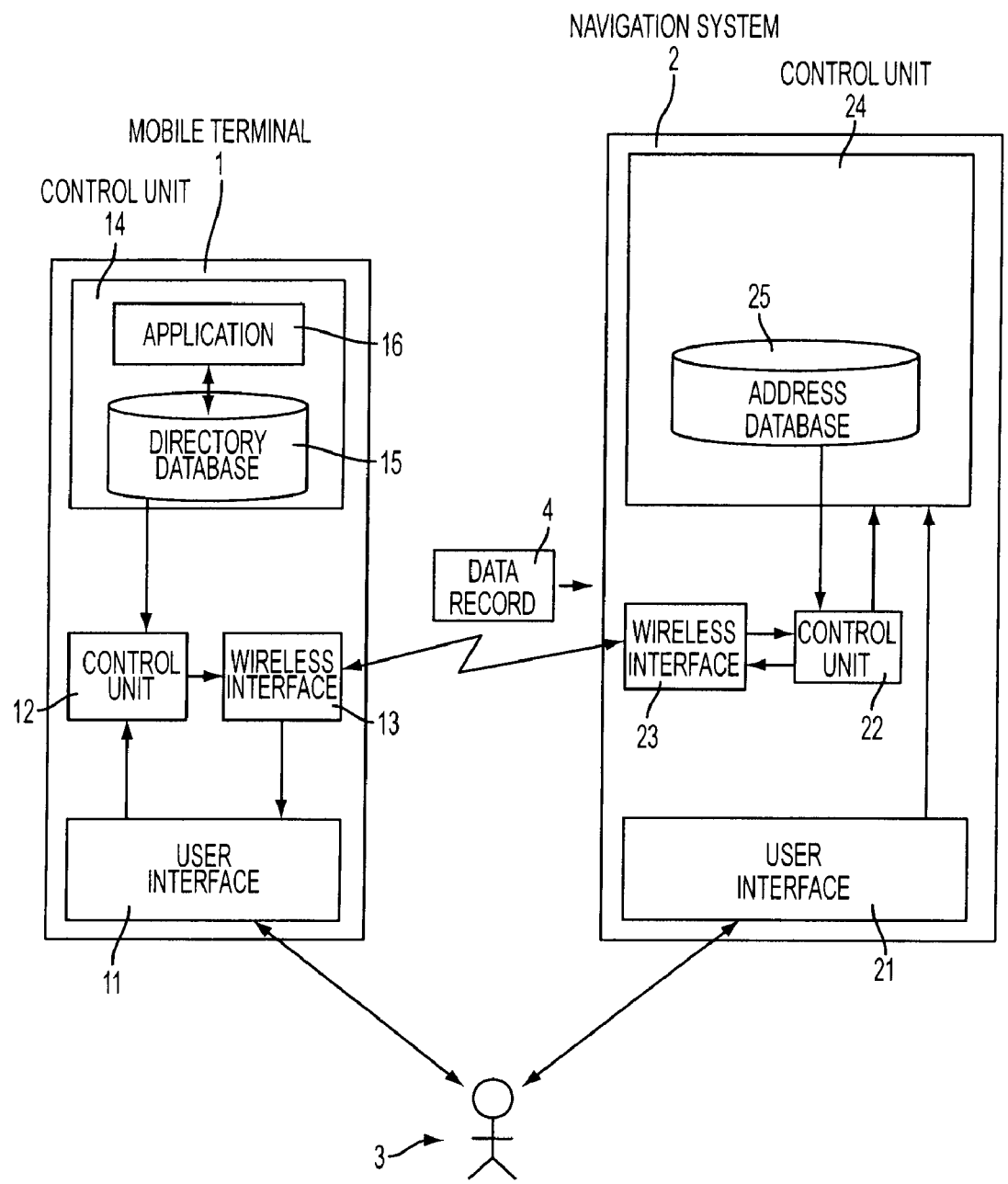
FIG. 1 is a block diagram showing a system with a mobile device and a navigation system according to the invention.

FIG. 1 shows a mobile terminal 1, a navigation system 2 and a user 3.

The mobile terminal 1 is a mobile phone or cellular phone, preferably according to the GSM or UMTS standard (GSM=Global System for Mobile Communication; UMTS=Universal Mobile Telecommunication Systems). But, it is also possible that the mobile terminal 1 is a PDA (PDA=Personal Digital Assistant). It is possible that such PDA comprises in addition to the other known functions of a PDA a communication unit for communicating via a radio interface with a cellular radio network, for example the aforementioned GSM or UMTS networks.

The mobile terminal 1 comprises a microprocessor with a plurality of peripheral units, a radio communication unit for communicating with a cellular communication network, a housing and several input and output devices arranged at the housing. Further, the mobile terminal 1 comprises a software platform and a plurality of application programs executed by the aforementioned hardware platform. The functionalities of the mobile terminal 1 are provided by the execution of this software by the aforementioned hardware platform. From functional point of view, the mobile terminal 1 comprises two control units 14 and 12, a short range wireless interface unit 13 and a user interface unit 11.

The user interface unit 11 contains the input and output means of the mobile terminal 1, for example, a keypad a liquid crystal display, a camera, a microphone and a loudspeaker. Further, the user interface unit 11 comprises the software drivers used for controlling these devices.

The control unit 14 comprises a directory data base 15 and a number of application accessing this data base. FIG. 1 shows an application 16 accessing the directory data base 15. Under control of the user interface unit 11, the application 16 displays entries of the directory data base 15 to the user 3, provides to the user 3 operations to amend, add and delete data base entries and establish telecommunication connections between the mobile terminal 1 and a subscriber specified within one of the entries of the directory data base 15.

The directory data base 15 contains a set of one or several data base entries. Each data base entry is assigned to a person and/or organization. For example, such entry contains the following set of information: Name of the person or organization, telephone numbers of the person or organization, fax-numbers of the person or organization, e-mail addresses of the person or organization, name of the company the person is working for, mailing address and premises of the person and the company, and further personal information added by the user 3. Different data base entry may comprise different kinds and different numbers of such information. Entries may be created and amended by help of the user interface 11, wherein the user 3 enters the data stored in the directory data base 15 via the input means of the user interface unit 11. But, it is also possible that such entries or a part of the data of such entries are downloaded in electronic form in the directory data base 15. For example, such data may be transferred via a parallel or serial interface of the mobile terminal 1 from a computer to the directory data base 15. For example, data stored in a mail system are transferred via a plug-in to the mobile terminal 1. Further, such data may be downloaded via the GSM or UMTS radio interface to the directory data base 15. Further, such data may be transferred from another mobile terminal to the mobile terminal 1, for example via a cable connection or via a short range wireless interface.

The short range wireless interface unit 13 supports a wireless, bi-directional communication with the navigation system 2. It is formed by a transceiver unit and corresponding software drivers that make it possible for the control unit 12 to exchange data via this interface. For example, the short range wireless interface is an infrared interface, a bluetooth interface or a W-LAN interface.

The control unit 12 selects under control of the user interface unit 11 at least one data record out of the directory data base 15 wherein this at least one data record includes data concerning an address. For example, it selects one or several entries of the directory data base 15 or selects a specific part of one or several entries of the data base 15.

According to a first embodiment of the invention, the control unit 12 provides operations to the user 3 enabling the user 3 to select one or several data base entries out of the set of data base entries stored in the directory data base 15 and initiating the transfer of these entries to the navigation system 2. When receiving such transfer command from the user interface unit 11, the control unit 12 copies the whole data records of the selected entries and sends these data records by means of the short range wireless interface unit 13 to the navigation system 2. In the following, the navigation system 2 has to scan and interpret the received data records and has to select, process and determine data of these records that relate to an address.

According to a further embodiment of the invention, the control unit 12 extracts address data included in an entry selected by the user 3. For example, it extracts data out of the entry which concerns the premises of the respective person or organization. But, it is also possible that the telephone number, the e-mail address or other kind of information stored in a data base entry are selected and in the following used to determine the address of the respective person or organization. For example, such data may be used to access a remote data base that assigns a corresponding address to such data. This data base may be accessed by the control unit 12 or may be accessed as well by the navigation system 2.

Further, it is possible that the control unit 12 applies a dynamic extracting of address data which takes into account the specific available information of the respective data base entry. For example, it first scans for premises data and, if such data are not available, scans for telephone numbers, e-mail addresses or further information which might be used to determine the corresponding address data.

The navigation system 2 is a system preferably installed in a vehicle which guides the driver of the vehicle along a route to a predefined destination. The navigation system 2 comprises one or several microprocessors or peripheral units, input and output means and several sensor means used to determine the location of the vehicle. Preferably, these sensor means at least comprising a GPS and/or Galileo receiver used to receive localization data from GPS and/or Galileo satellites. Further, the navigation system could have sensors for determining the travelling direction and the traveled distance, as for example described in U.S. Pat. No. 5,353,023.

The functionalities of the navigation system 2 are provided by the execution of various software programs on the aforementioned hardware platform. From functional point of view, the navigation system 2 comprises two control units 24 and 22, a short range wireless interface unit 23 and a user interface unit 21.

The user interface unit 21 provides a simple user interface to the user 3. For example, it is composed of a LCD display for displaying road map data, direction data and a control and management menu, a keypad and a loudspeaker for outputting guidance instructions to the user 3.

The control unit 24 provides the typical services of a navigation system. It calculates a route based on destination data received from the user interface unit 21 or the control unit 22 and guides the user by means of the user interface unit 21 and the data received from the sensor means along this route. For performing this job, the control unit 24 accesses road map data that are stored in a storage means of the navigation system 2 or stored in a remote data base access via a communication network, for example via a GSM or UMTS network. Further, it is also possible that the route calculation is executed by a remote server and the control unit 24 guides the user 3 by means of route data received from a remote server. Further, the control unit 24 has an address data base 25 which links addresses with localization coordinates. But, it is also possible that the address data base 25 arranged in a remote server accessed by the control unit 24.

The short range wireless interface unit 23 is equipped as the short range wireless interface unit 13.

The control unit 22 extracts from the data records received from the mobile terminal 1 destination data capable to be used as source for a destination processed by a navigation system. In case it receives from the mobile terminal 1 a data record 4 containing a whole entry of the directory data base 15 it processes the data record 4 and filters out premises data by comparing the characteristics of premises data with consecutive parts of the data record 4. Since different kinds of mobile terminals may be used for inputting destination data into the navigation system 2, the control unit 22 cannot relate to a fixed position of such data and has to scan the whole received data records for selecting a data string that could represent such premises data. This matching process is done by help of the address data base 25 which provides the data base for such matching process. If it is not possible for the control unit 22 to extract premises data out of the received data record, the control unit 22 tries to filter out second source destination data, for example, an e-mail address or telephone number that identifies a user and could be used in a query process to determine an address assigned to this user. Further, the control unit 22 checks the plausibility of the extracted destination data by means of the address data base 25. For example, it checks whether the extracted address data matches with address data stored in the address data base 25 and corrects or complements the address data by means of a correlation process between the extracted address data and the address data stored in the address data base 25.

If the control unit 22 comes to the result that the extracted address data are not correct or have to be corrected or complemented in a specific way, it sends back a notification via the short range wireless units 23 and 13 to the control unit 12. The control unit 12 displays this notification via the user interface unit 11 to the user 3 and requests the user 3 to add additional information or approve the correction or complementation. Upon a corresponding message transmitted from the control unit 12 to the control unit 22, the control unit 22 submits the corrected or complemented destination data to the control unit 24 which uses these destination data as source for a destination processed by the navigation system. For example, it determines by means of premises data and the address data base 25 the localization coordinates of the destination and executes in the following route calculations based on this destination data.

According to a further embodiment of the invention, the data record 4 does already contain preprocessed address data which might be extracted by the control unit 22 in a predefined way. In such case, the control unit 22 extracts, for example, a predefined data string of the data record 4 and transfers this data string as destination data to the control unit 24 which calculates the corresponding localization coordinates and the corresponding route as described above.

When entering a car equipped with the navigation system 2, the user 3 brings its mobile terminal, for example the mobile terminal 1 into contact with the navigation system. For example, it places the mobile terminal 1 in the neighborhood of the navigation system 2 and enters a command to the navigation system 2 and/or to the mobile terminal 1 to actuate a wireless connection between the short range wireless interface units 13 and 23. Then, it selects by means of the operations provided by the control unit 12 one or several persons or organizations out of the persons and organizations registered in the directory data base 15. Then, it enters a command in the mobile terminal 1 that initiates the transfer of one or several data records via the short range interface to the navigation system 2. The control unit 22 extracts from the received data records destination data capable to be used as source for a destination processed by the navigation system 2. For example, it extracts premises data or address data of the selected one or several persons or organizations. The control unit 22 submits this information to the control unit 24 which uses these data as source for determining destinations forming the basis of a route calculation.

The invention claimed is:

1. A method of inputting destination data into a navigation system, the method comprising:
   bringing a mobile terminal including a short range wireless interface into wireless communication with the navigation system via the short range wire less interface;
   selecting, at the mobile terminal, at least one data record that is stored in the mobile terminal, said at least one data record including data associated with an address;

transferring the at least one data record that is selected from the mobile terminal to the navigation system via the short range wireless interface;

extracting, at the navigation system, destination data from the at least one data record that is received and using the destination data that is extracted as a destination address to determine a destination route corresponding to the destination address by the navigation system;

checking, at the navigation system, plausibility of extracted destination data using an address data base, or correcting, at the navigation system, the extracted destination data using the address database;

providing a back-channel between the mobile terminal and the navigation system; and sending a notification back via said back-channel to the mobile terminal if the address data are not correct or if the address data are corrected.

2. The method of claim 1, wherein the transferring the at least one data record comprises transferring a data record as the at least one data record comprising a whole entry of a selected user that is stored in a directory data base of the mobile terminal; and the method further comprises scanning, at the navigation system, the at least one data record for address data included in the whole entry of the selected user and extracting the address data that is detected by the scanning.

3. The method of claim 2, wherein the at least one data record is encoded in an ASCII format and transferred to the navigation system.

4. The method of claim 1, further comprising extracting, at the mobile terminal, address data included in an entry of a selected user that is stored in a directory data base of the mobile terminal and transferring the address data that is extracted within the at least one data record to the navigation system.

5. The method of claim 1, wherein the method further comprises checking, at the navigation system, the plausibility of the destination data that is extracted by comparing the destination data that is extracted with address data stored in an address data base.

6. The method of claim 1, further comprising correcting, at the navigation system, the destination data that is extracted with address data stored in an address data base.

7. The method of claim 5, further comprising sending a query to a remote address data base, which is remote to the mobile terminal and the navigation system.

8. The method of claim 5, further comprising sending a notification via the short range wireless interface back to the mobile terminal, if the destination data that is extracted is not correct based on the checking of the plausibility of the destination data.

9. A mobile terminal, comprising:

a short range wireless interface unit which communicates wirelessly with a navigation system;

a storage unit which stores data associated with at least one address; and a control unit which selects at least one data record including data associated with an address and wirelessly transfers the at least data record that is selected to the navigation system via the short range wireless interface unit;

wherein the mobile terminal receives a notification from the navigation system via a back-channel provided between the mobile terminal and the navigation system if the navigation system determines that the address data are not correct or if the address data has been corrected by the navigation system.

10. A system comprising:

a navigation system; and a mobile terminal including a short range wireless interface unit which communicates wirelessly with the navigation system, a storage unit which stores data associated with at least one address, and a control unit which selects at least one data record associated with an address and wirelessly transfers the at least one data record that is selected to the navigation system via the short range wireless interface unit, wherein the navigation system extracts destination data from the at least one data record that is received and uses the destination data that is extracted as a destination address to determine a destination route corresponding to the destination address; and wherein the navigation system checks plausibility using an address data base or the navigation system corrects the extracted destination data using the address data base, wherein the navigation system sends a notification back to the mobile terminal via back-channel provided between the mobile terminal and the navigation system if the address data are not correct or if the address data are corrected.

* * * * *